J. B. WEBBER, Jr.
EXCAVATOR CONTROLLING MECHANISM.
APPLICATION FILED MAR. 24, 1908.
910,617.
Patented Jan. 26, 1909.
2 SHEETS—SHEET 1.
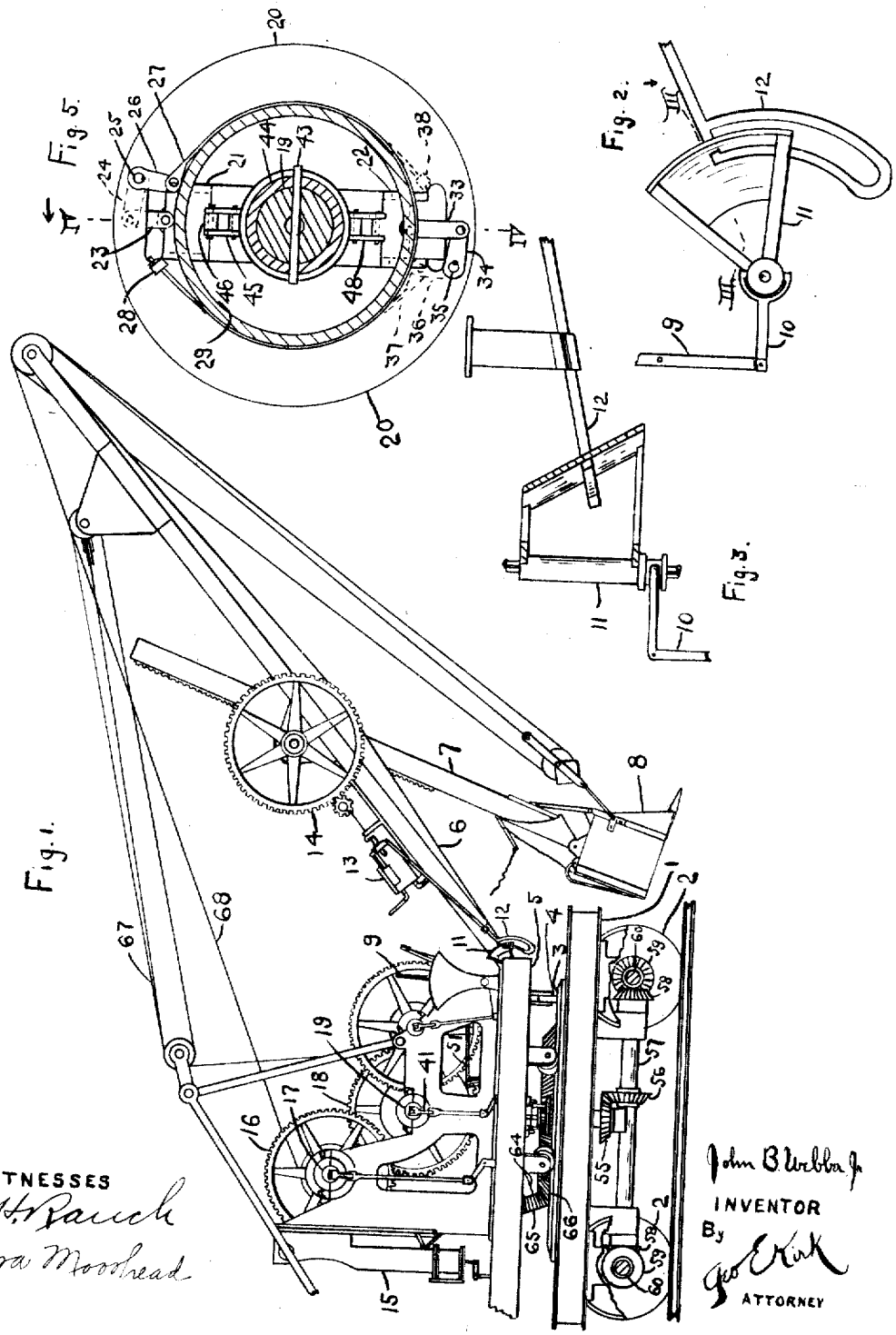
WITNESSES
INVENTOR
John B. Webber Jr.
By Geo E Kirk
ATTORNEY

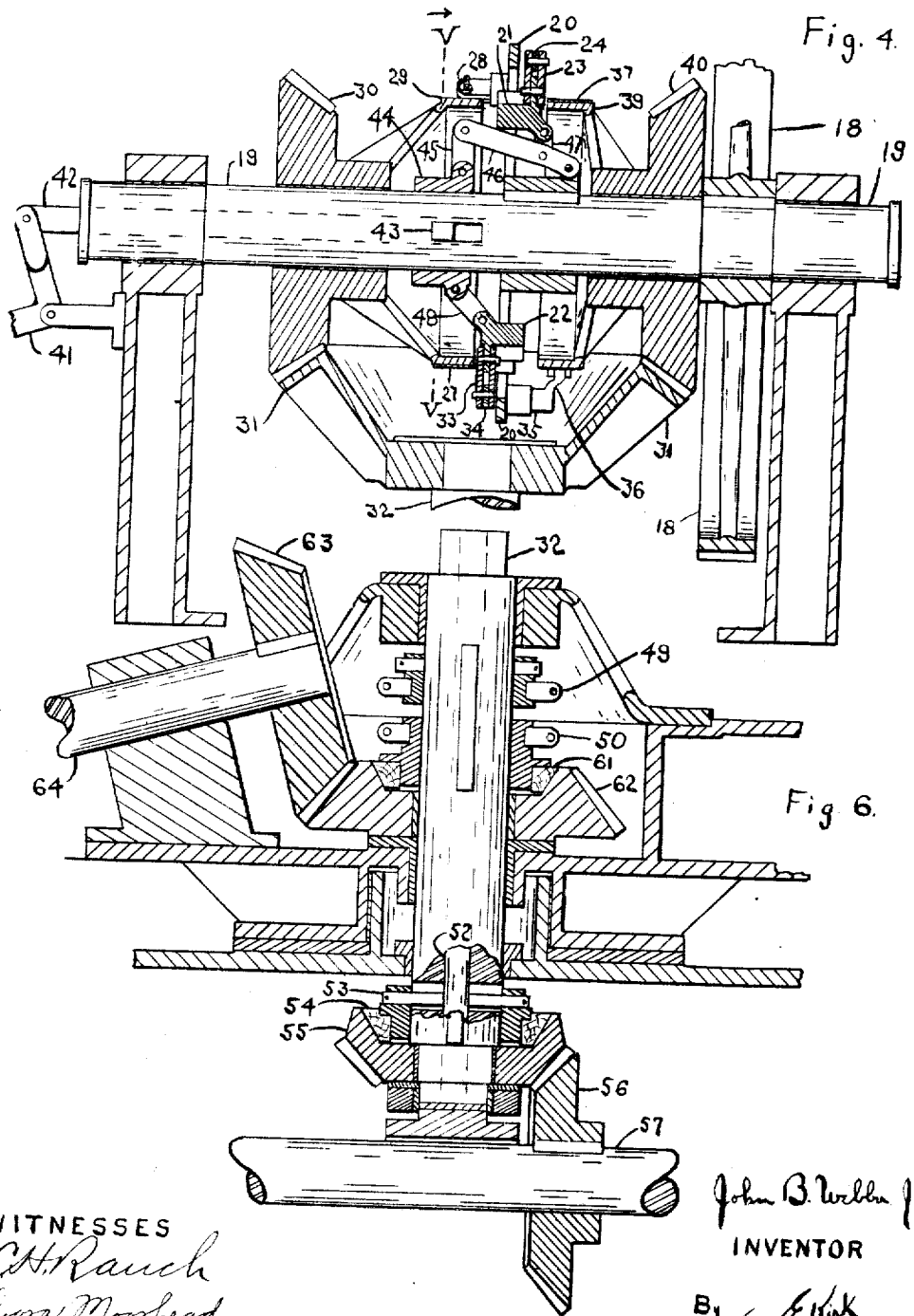

UNITED STATES PATENT OFFICE.

JOHN B. WEBBER, JR., OF TOLEDO, OHIO, ASSIGNOR TO THE VULCAN IRON WORKS COMPANY, OF TOLEDO, OHIO, A CORPORATION OF OHIO.

EXCAVATOR CONTROLLING MECHANISM.

No. 910,617.   Specification of Letters Patent.   Patented Jan. 26, 1909.

Application filed March 24, 1908. Serial No. 422,932.

*To all whom it may concern:*

Be it known that I, JOHN B. WEBBER, Jr., a citizen of the United States, residing at Toledo, Lucas county, Ohio, have invented a new and useful Excavator Controlling Mechanism, of which the following is a specification.

This invention relates to the driving and control of mechanism, especially to permit of more general handling in operation.

This invention has utility when embodied in power driven machines, as excavators. When embodied in such machines, the operator, from his station on the platform, may conveniently and rapidly control the working member of the machine, particularly in thrusting. In connection with this operation, the platform may be quickly swung to and fro and the excavator truck moved backward and forward.

Referring to the drawings: Figure 1 is a side elevation of an embodiment of the invention in a power shovel, parts being broken away; Fig. 2 is a detail view on an enlarged scale of a portion of the connection from the platform to the prime mover on the boom; Fig. 3 is a section on the line III—III, Fig. 2; Fig. 4 is a fragmentary transverse section, taken medially of the excavator, showing the clutch connections from the horizontal shaft to reversely drive the vertical shaft, being on the line IV—IV, Fig. 5; Fig. 5 is a section on the line V—V, Fig. 4; and Fig. 6 is a fragmentary longitudinal section, taken medially of the excavator, showing the clutch connections for platform swinging and truck propelling.

The truck 1, mounted on wheels 2, carries the track 3, on which travel the rollers 4 sustaining the platform 5. Pivotally mounted adjacent one end of the platform 5 is the adjustable boom 6, in which is the movable directing and thrusting member 7 for the working member or shovel 8.

On the platform 5 is a controlling device comprising hand lever 9, connected to bell crank lever 10 (Figs. 2 and 3), to reciprocate the cone segment 11. Engaging the outer and inner faces of the cone segment 11, is the link 12, the operation of which effects the control of reversible prime mover 13 on the boom 6, so that wheel 14 may be driven to cause the directing member 7 to thrust or withdraw the shovel 8. Carried by the platform 5 is prime mover 15, which through wheel 16 and shaft 17 actuates wheel 18 on shaft shaft 19. Fixed on this shaft 19 so that it may have no relative movement, is the clutch element carrier or disk 20 (Figs. 4 and 5). Slidably mounted in this carrier are the diametrically opposite radially movable blocks 21, 22. Block 21 is connected by links 23 to reciprocate one end of arm 24, thereby rocking shaft 25, which through arm 26 is connected to the friction band clutch element 27. The other end of band 27 is connected by bracket 28 to the carrier 20. This band 27 extends around the periphery of the clutch face flange 29 carried by gear wheel 30 loosely mounted on shaft 19. The wheel 30 is in mesh with gear wheel 31 on shaft 32. From block 22, links 33 extend to arm 34 on rock shaft 35, which shaft 35 has an arm 36 connected to one end of friction band or clutch element 37, the opposite end of which band 37 is connected to bracket 38 on the carrier 20. This clutch element 37 surrounds the periphery of clutch face on the flange 39 carried by wheel 40. The clutch face carrying flanges on the wheels 30 and 40 extend toward or oppose each other. The wheel 40 is also in mesh with the wheel 31.

As herein shown, a portion of shaft 19 is tubular, the bell crank lever 41 being so connected up as to reciprocate the stem 42 in the shaft 19. This stem or rod 42 has a cross-head or spline 43 engaging collar 44 to reciprocate this collar relatively to shaft 19, as also relatively to the clutch element carrier 20. Collar 44 is connected by link 45 to the lever 46, the opposite end of which lever is pivoted to the hub of the carrier 20, while medially there is a link 47 connecting the lever 46 with the slide block 21. Diametrically disposed as to link 45, the link 48 connects the collar 44 to slide block 22.

Splined on shaft 32 (Fig. 6) are collars 49, 50, controlled through connections 51 (Fig. 1). Collar 49 is connected to the stem 52 in the tubular shaft 32, which stem 52, by key 53 is attached to clutch member 54. Friction clutch member 54 serves to connect wheel 55 to drive wheel 56 on propelling shaft 57, which through the gear wheels 58 and 59 actuate the shafts 60 to which the traction wheels 2 of the truck are fixed. Collar 50 is directly connected to friction clutch member 61, which serves to connect the bevel gear 62, which like wheel 55 is also loosely mounted on the shaft 32. The gear 62 is in mesh with gear wheel 63 on shaft 64, which through gear 65 and toothed way 66 may bring about the swinging of platform 5. The hoisting of the shovel 8 is brought about through flexible connection 68, while the hoisting and lowering of the boom 6 is accomplished through the flexible connection 67.

Operation: Adjustments of the boom, as for higher dumping or lower cutting, may be had, and the control of the prime mover on the boom not affected by such change, for the cone segment of the slide 11 is on the same axis as the boom 6. In raising the boom, member 12 will not be reciprocated, but will move upward on the cone segment, while in this new position reciprocation of the segment 11 will bring about the same control as in any other position of the boom. Accordingly, regardless of the position of the boom, the control lever 9 for the boom engines 13 is always in the same place when power is off, and is with the bank of levers on the platform at the operator's station. To this convenience in handling the shovel, is added a quick and easy control for swinging and traveling to dump as desired. This is brought about through the connections at shaft 19, which shaft may be considered as continuously driven in one direction. In the position shown in Fig. 4, with the collar 44 at one limit of movement, the link 48 has drawn the slide 22 inwardly, while link 45 through lever 46 has thrust the block 21 outwardly, thus through the link 23, crank arm 24 so rocks the shaft 25 that its arm 26 will pull the friction band 27 against the flange 29. With the collar 44 in a medial position, both friction bands 27 and 37 are free.

With the collar 44 thrown to its limit of movement toward the carrier 20, link 45 holds lever 46 so that friction band 27 is loose, while the driving, instead of being in one direction through wheel 30 to shaft 32, is now in the opposite direction through the wheel 40 to shaft 32, for the link 48 has thrust the block 22 outwardly, and thereby through the link 33, and arm 34 so rocked the shaft 35 that its arm 36 has tightened the friction band 37 about the clutch face on flange 39 of the wheel 40. A considerable advantage in this band clutch, (in addition to coupling while shaft 19 is running,) is that when but slightly thrown in, the direction of rotation is such that the friction on the clutch face at once aids in further applying the driving connection. The shaft 32 is thus readily connected for either direction driving. As the propelling mechanism is connected by a friction clutch 54, it may be thrown in while shaft 32 is running, and while the truck is thus traveling, the platform may be swung by throwing in the friction clutch 61. Accordingly this system of clutches, and the control device for the boom prime mover, combine to contribute to sure and rapid handling of the power machine.

What is claimed and it is desired to secure by Letters Patent is:

1. A power machine having a platform, a boom on the platform, mechanism for adjusting the boom, a prime mover on the boom, a controlling device on the platform for the prime mover, the boom adjustable relatively to the controlling device and connections between the controlling device and the prime mover to accommodate the various adjustments of the boom.

2. A power excavator having a platform, a boom mounted on and adjustable relatively to the platform, a reversible prime mover on the boom, a control device on the platform, and connections from the control device to the prime mover permitting adjustment of the boom.

3. A power excavator having a platform, a vertically adjustable boom mounted on the platform, a reversible prime mover on the boom, a control device on the platform, and self-adjusting connections from the control device to the prime mover automatically taking care of the various positions of the boom.

4. A power machine comprising driving mechanism, a shaft, a clutch element carrier fixed on the shaft, opposing wheels each having a clutch face adjacent the carrier, and a control means effective to connect either wheel to said shaft to actuate the driven mechanism in reverse directions.

5. A power machine having a truck, a platform on the truck, a boom on the platform, a working member carried by the boom, platform swinging and truck propelling mechanism, and reversible driving connections therefor comprising band clutches.

6. A power excavator having a swingable platform, a shaft for swinging the platform, and band clutches oppositely acting to reverse the shaft and change the direction of swing of the platform.

7. A power excavator having a truck, a shaft for operating the truck, and band clutches oppositely acting to reverse the shaft to change the direction of truck travel 8. A power machine having a platform, swinging mechanism for the platform, a reversible shaft for driving the swinging mechanism, and a friction clutch to connnect the shaft and mechanism.

9. A power machine having a truck, propelling mechanism for the truck, a swingable platform on the truck, a prime mover on the platform, a reversible shaft actuated by the prime mover, and a friction clutch to connect the shaft and propelling mechanism.

In witness whereof I affix my signature in the presence of two witnesses.

JOHN B. WEBBER, Jr.

Witnesses:
 M. W. PLATT,
 GEO. E. KIRK.